US 6,655,193 B1

(12) United States Patent
Liu

(10) Patent No.: US 6,655,193 B1
(45) Date of Patent: Dec. 2, 2003

(54) LEAKAGE DETECTING DEVICE FOR CYLINDERS OF A VEHICLE ENGINE

(76) Inventor: Lai-Chen Liu, No. 1, Alley 10, Lane 291, Yung-Feng Rd., Taiping City, Taichung Hsien (TW)

( * ) Notice: Subject to any disclaimer, the term of this patent is extended or adjusted under 35 U.S.C. 154(b) by 0 days.

(21) Appl. No.: 10/244,673

(22) Filed: Sep. 17, 2002

(51) Int. Cl.[7] ................................. G07M 3/04
(52) U.S. Cl. ..................... 73/45.8; 73/49.7; 73/49.8
(58) Field of Search ................. 73/49.7, 49.8, 73/46, 47, 119 R, 45.8

(56) References Cited

U.S. PATENT DOCUMENTS

| | | | | |
|---|---|---|---|---|
| 2,983,238 A | * | 5/1961 | Kayser | 112/77 |
| 3,442,443 A | * | 5/1969 | Kilbourn | 73/47 |
| 4,467,636 A | * | 8/1984 | Dagn | 73/49.8 |
| 4,750,350 A | * | 6/1988 | Klein | 73/49.7 |
| 5,295,747 A | * | 3/1994 | Vinci | 73/45.8 |

* cited by examiner

*Primary Examiner*—Michael Cygan
(74) *Attorney, Agent, or Firm*—Varndell & Varndell, PLLC

(57) ABSTRACT

A leakage detecting device has a cover, a first cup and a second cup. The cover is mounted on the opening of the water tank and has a through hole. The first cup is connected to the cover and communicates with the through hole in the cover. A tortuous air channel is defined in the first cup. The second cup is mounted on the first cup and has a second tortuous air channel communicating with the first tortuous air channel in the first cup. Accordingly, the leakage of cylinders of the vehicle engine can be precisely detected from the water tank of the vehicle.

5 Claims, 4 Drawing Sheets

LEAKAGE DETECTING DEVICE FOR CYLINDERS OF A VEHICLE ENGINE

BACKGROUND OF THE INVENTION

1. Field of the Invention

The present invention relates to a leakage detecting device and more particularly to a leakage detecting device for cylinders of a vehicle engine.

2. Description of Related Art

After a time of use, gaskets or seals on the cylinders of a vehicle engine become worn, cracked etc. Due to the wear of the gasket or the seal, the waste gases such as carbon monoxide will leak out from the cylinder and some of them will flow into the water tank of the vehicle. Therefore, the leakage of the cylinders of the vehicle engine is detected from the water tank by means of measuring the density of the carbon monoxide in the water tank. With reference to FIG. 5, a conventional way to detect the density of the carbon monoxide in the water tank (60) uses a balloon sampler (50). The sampler (50) comprises a balloon and a sampling tube attached to and communicating with the balloon. When the balloon is compressed, the air in the balloon will be pressed out from the sampling tube. When the balloon is released, the air at the outer circumstance will be sucked into the balloon through the tube. Accordingly, the sampler can sample the air in the water tank (60) through an opening (61) in the tank (60). After sampling air from the water tank (60), the air in the balloon is released into a container (70) contained with a reagent for carbon dioxide. The density of the carbon dioxide will be measured by means of the change in color of the reagent, and the leakage condition of the cylinders of the vehicle engine will be observed.

However, the fresh air at the surroundings will also be sucked into the balloon while the sampler (50) is sampling the air from the water tank (60). The detecting result applied by the conventional way with the balloon sampler (50) is not precise.

To overcome the shortcomings, the present invention tends to provide a leakage detecting device to mitigate or obviate the aforementioned problems.

SUMMARY OF THE INVENTION

The main objective of the invention is to provide a leakage detecting device for cylinders of a vehicle engine that can precisely detect the leakage of the cylinders by sampling the water from the water tank of the vehicle. To achieve the above objective, the leakage detecting device has a cover, a first cup and a second cup. The cover is mounted on the opening of the water tank and has a through hole. The first cup is connected to the cover and communicates with the through hole in the cover. A connecting tube has a first end extending through the closed end of the first cup and connected to the through hole in the cover and a second end extending into the first cup. A first cap is mounted in the first cup and surrounds the second end of the connecting tube. The first cap has a closed end separated from the second opening end of the connecting tube and the opening end separated from the closed end of the first cup. The second cup is mounted on an opening end of the first cup. A guide tube is mounted on the closed end of the second cup and communicates with a bottom hole defined in the closed end of the second cup, and the guide tube has a top opening end. A second cap is mounted in the second cup and surrounds the top opening end of the guide tube. The second cap has a closed end separated from the top opening end of the guide tube and an opening end separated from the closed end of the second cup.

Other objects, advantages and novel features of the invention will become more apparent from the following detailed description when taken in conjunction with the accompanying drawings.

DETAILED DESCRIPTION OF PREFERRED EMBODIMENT

Figure 1:
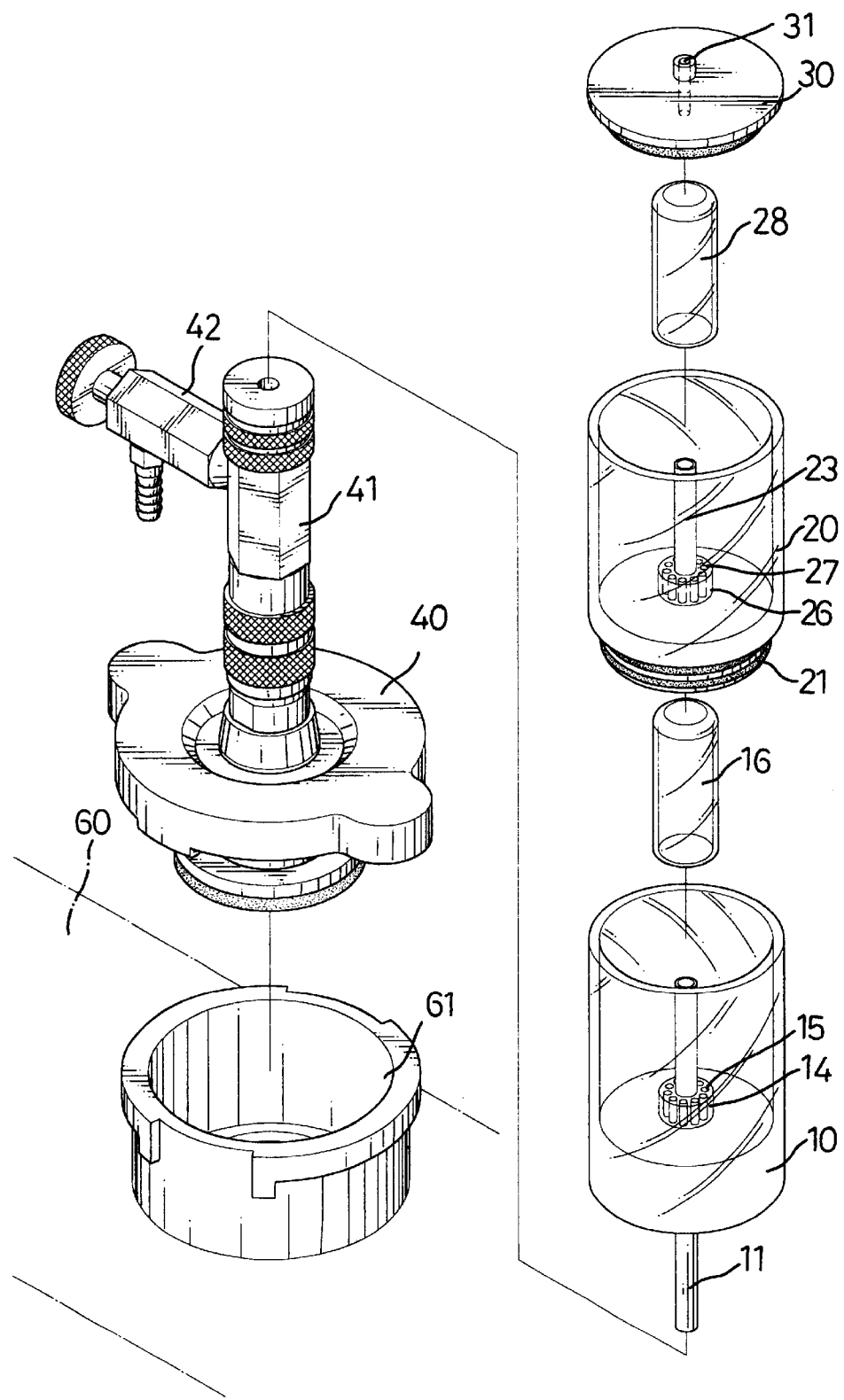
FIG. 1 is an exploded perspective view of a leakage detecting device in accordance with the present invention.
Figure 2:
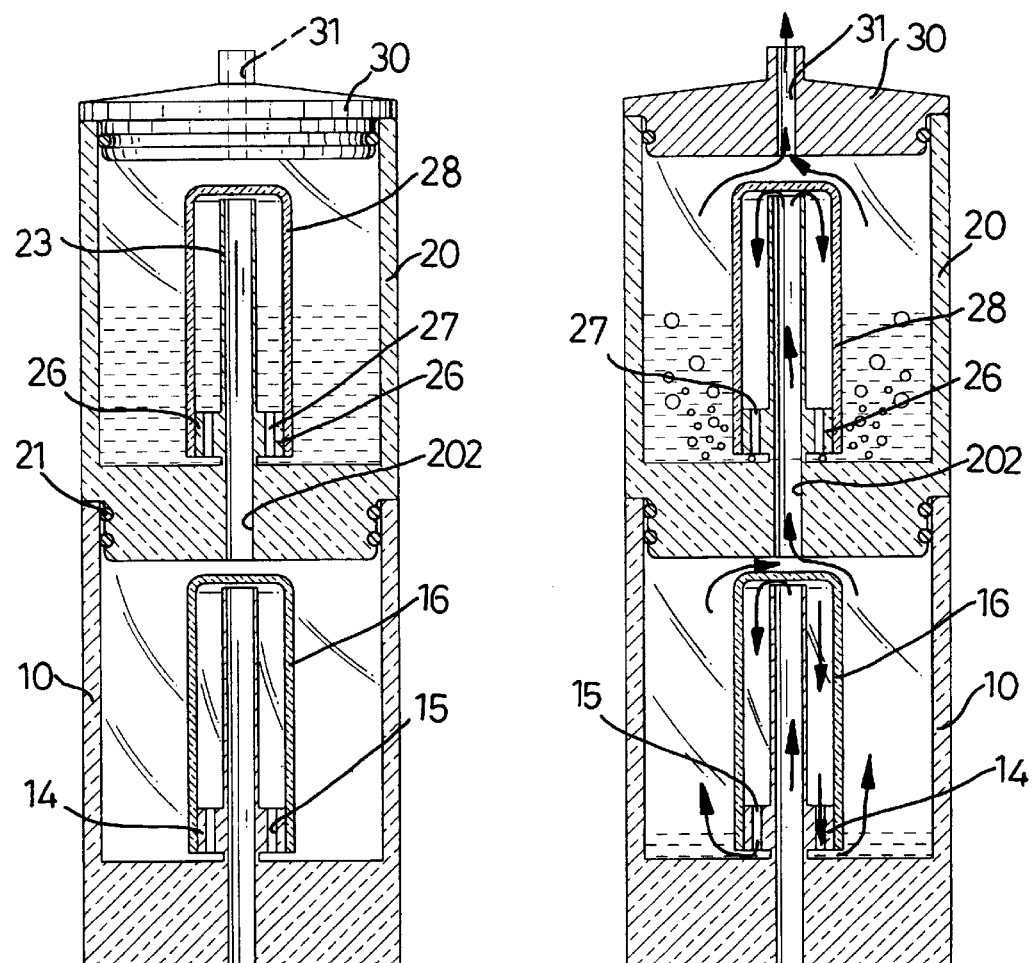
FIG. 2 is a side plan view in partial cross section of the first and second cups of the leakage detecting device in FIG. 1.

With reference to FIGS. 1 and 2, a leakage detecting device in accordance with the present invention comprises a cover (40), a first cup (10) and a second cup (20). The cover (40) is mounted on an opening (61) of a water tank (60) of a vehicle. A through hole (not shown) is defined through the cover (40) to communicate with the water tank (60). A connector (41) is mounted on the cover (40) and communicates with the through hole in the cover (40). In practice, a releasing valve (42) is attached to the connector (41), such that the pressure in the water tank (60) can be released through the releasing valve (42).

The first cup (10) is connected to the cover (40) with the connector (41). The first cup (10) has a closed end and an opening end. A connecting tube (11) has a first opening end extending through the closed end of the first cup (10) and connected to the connector (41), such that the first opening end of the connecting tube (11) is connected to the through hole in the cover (40) through the connector (41). The connecting tube (11) has a second opening end extending into the first cup (10). A base (14) is formed on the connecting tube (11) at a position near the closed end of the first cup (10) and is received in the first cup (10). The base (14) has a bottom separated from the closed end of the first cup (10) so as to define a gap between the bottom of the base (14) and the closed end of the first cup (10). Multiple through holes (15) are defined through the base (14) and communicate with the gap between the base (14) and the closed end of the first cup (10).

A first cap (16) is received in the first cup (10) and surrounds the second opening end of the connecting tube (11). The first cap (16) has a closed end separated from the second opening end of the connecting tube (11) and an opening end pressed onto the base (14) and separated from the closed end of the first cup (10). Accordingly, a first tortuous air channel is defined in the first cup (10) and extends along the connecting tube (11), the first cap (16), the through holes (15) in the base (11) and the inner space in the first cup (10).

The second cup (20) is mounted on the opening end of the first cup (10). The second cup (20) has an opening end and a closed end mounted on the opening end of the first cup (10). A bottom hole (202) is defined through the closed end of the second cup (20) to communicate with the inner space of the first cup (10). In practice, at least one O-ring (21) is mounted around the closed end of the second cup (20) and abuts the inner surface of the opening end of the first cup (10) so as to provide a sealing arrangement between the first cup (10) and the second cup (20).

A guide tube (23) is mounted on the closed end of the second cup (20) and communicates with the bottom hole (202) in the closed end of the second cup (20), and the guide tube (23) has a top opening end. A base (26) is formed on the guide tube (23) at a position near the closed end of the second cup (20) and is received in the second cup (20). The base (26) has a bottom separated from the closed end of the second cup (20) so as to define a gap between the bottom of the base (26) and the closed end of the second cup (20). Multiple through holes (27) are defined through the base (26) and communicate with the gap between the base (26) and the closed end of the second cup (20).

A second cap (28) is received in the second cup (20) and surrounds the top opening end of the guide tube (23). The second cap (28) has a closed end separated from the top opening end of the guide tube (23) and an opening end pressed onto the base (26) and separated from the closed end of the second cup (20). Accordingly, a second tortuous air channel is defined in the second cup (20) and extends along the guide tube (23), the second cap (28), the through holes (27) in the base (26) and the inner space in the second cup (20).

In addition, a lid (30) is mounted on the opening end of the second cup (20) and has a top hole (31) defined through the lid (30).

Figure 3:
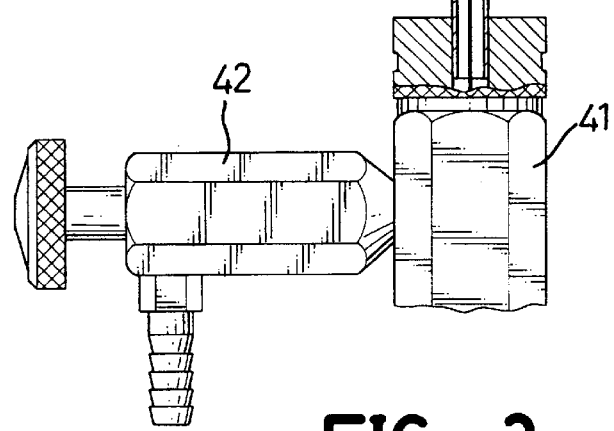
FIG. 3 is an operational side plan view in partial cross section of the leakage detecting device in FIG. 1.

With reference to FIGS. 1 and 3, when the detecting process is applied, the original cover on the water tank (60) is replaced with the cover (40) with the connector (41). Before the cover (40) is attached onto the opening (61) of the water tank (60), about one-fifth or a quarter of the water in the water tank (60) is pumped out from the water tank (60). Accordingly, the moisture in the water tank (60) and that occurring during the operation of the vehicle engine will be reduced.

The first opening end of the connecting tube (11) is then inserted into the connector (41) so as to connect the first cup (10) to the connector (41). The second cup (20) is put on the opening end of the first cup (10), and a reagent for carbon dioxide is contained in the second cup (20). Then, the vehicle engine is switched on, and the temperature in the water tank (60) will increase and the air in the water tank (60) will be heated. Consequently, the heated air in the water tank (60) will ascend and will flow into the connecting tube (11) through the through hole in the cover (40) and the connector (41). The air will flow into the second cup (20) through the first tortuous air channel in the first cup (10), the bottom hole (202) and the guide tube (23). When the heated air flows through the first tortuous air channel, most of the moisture in the heated air will condense and will be stored in the first cup (10). Therefore, the moisture in the air will be reduced while the air flows into the second cup (20). When the heated air flows into the second cup (20), the heated air will be discharged from the top hole (31) in the lid (30) through the second tortuous air channel in the second cup (20). When the heated air flows through the second tortuous air channel, the color of the reagent in the second cup (20) will change if the density of the carbon dioxide in the heated air is over a desired level. Accordingly, the leakage of the cylinders of the vehicle engine will be detected by means of observing the change in color of the reagent in the second cup (20).

Figure 5:
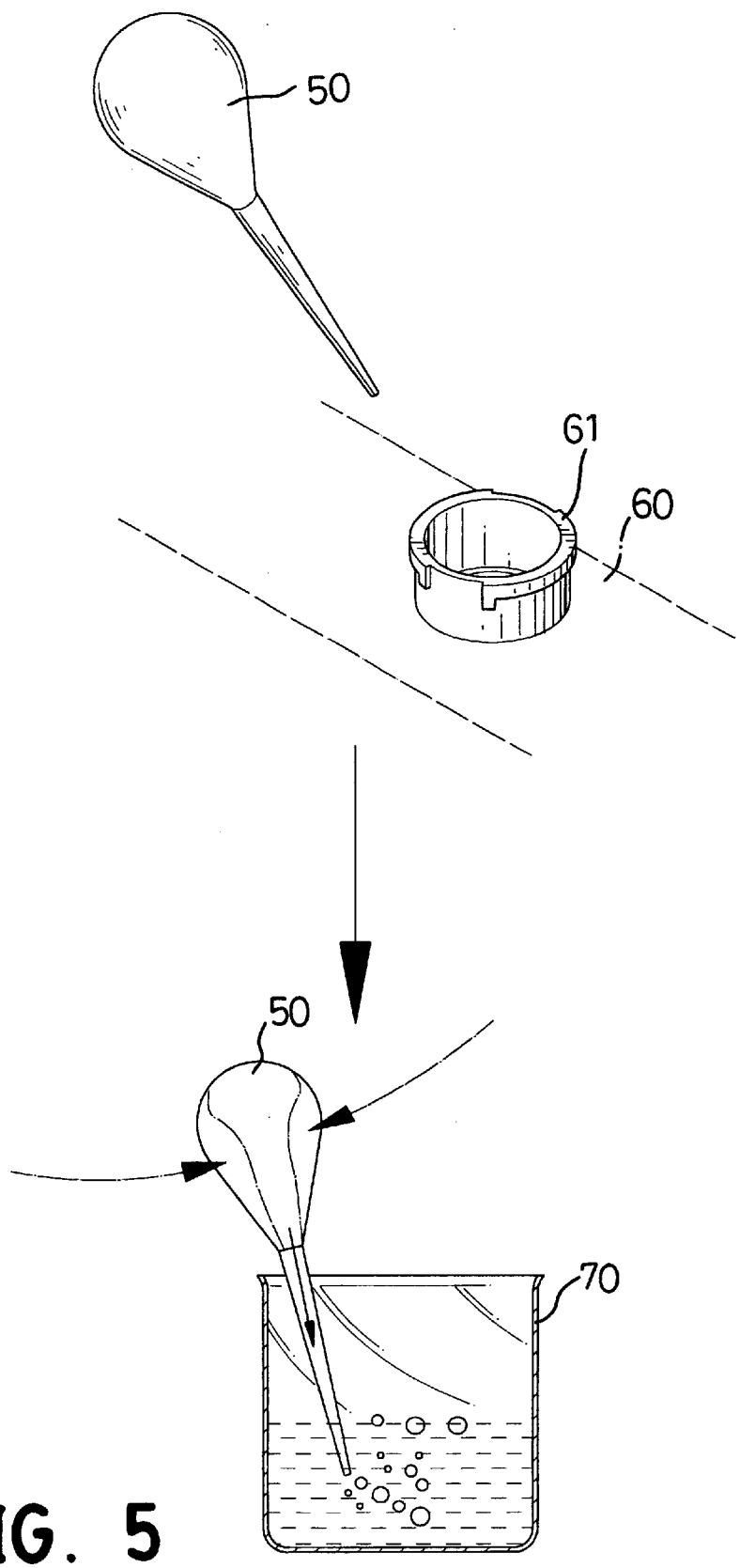
FIG. 5 is an operational drawing of a conventional way for detecting the leakage of cylinders of a vehicle engine from a water tank with a balloon sampler in accordance with the prior art.

Because the heated air out from the opening (61) of the water tank (60) will naturally ascend and directly flow into the detecting device, the heated air will not combine with the fresh air at the outer circumstance. The detecting result applied with the detecting device is more precise than that applied by the conventional way as shown in FIG. 5.

Figure 4:
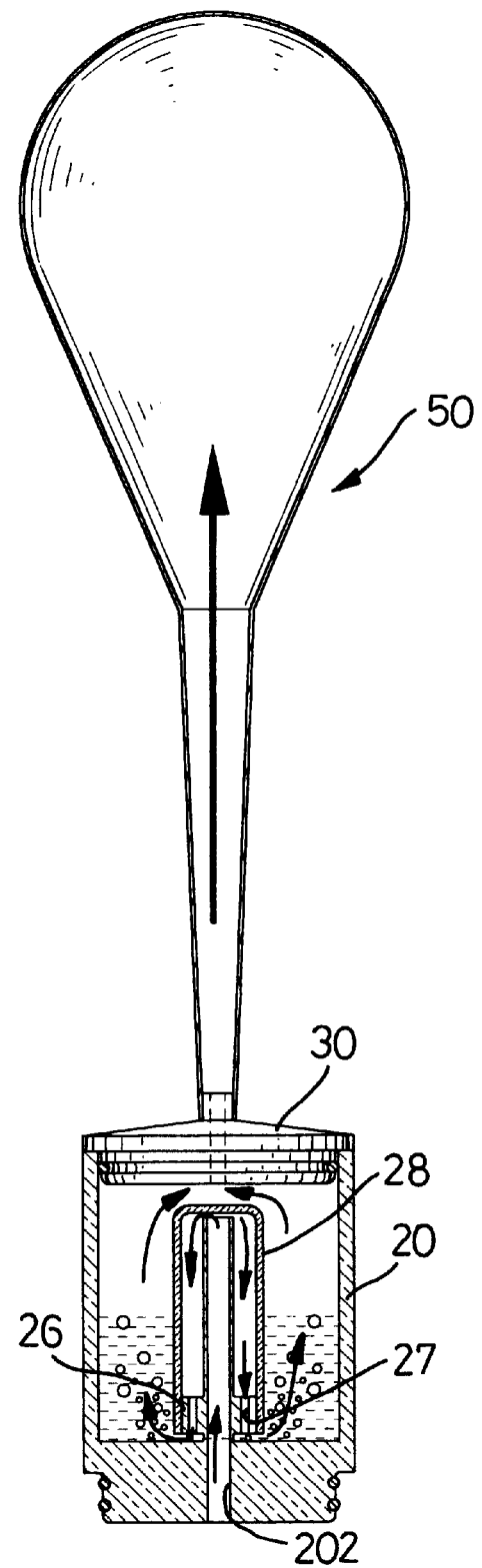
FIG. 4 is an operational side plan view in partial cross section of the second cup of the leakage detecting device in FIG. 1 showing that the reagent in the second cup is recovered with a conventional balloon sampler.

With reference to FIG. 4, after the detecting process, the second cup (20) with the reagent is taken from the first cup (10). A conventional balloon sampler (50) is connected to the top hole (31) in the lid (30). The balloon of the sampler (50) is compressed and is then released such that the air at the outer surroundings will be pumped into the second cup (20) through the bottom hole (20), the guide tube (23), the second cap (28) and the through holes (27) in the base (26). Consequently, the reagent for carbon dioxide in the second cup (20) will be recovered with the fresh air, such that the reagent can be recycled.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A leakage detecting device for a cylinder of a vehicle engine having a water tank with an opening comprising:

a cover adapted to be mounted on the opening of the water tank and having a through hole defined through the cover;

a first cup connected to the cover and having a closed end and an opening end, a connecting tube having a first opening end extending through the closed end of the first cup and connected to the through hole in the cover and a second opening end extending into the first cup;

a first base formed on the connecting tube and received in the first cup, the first base having a bottom separated from the closed end of the first cup so as to define a gap between the bottom of the base and the closed end of the first cup, the first base having multiple through holes defined through the first base and communicating with the gap between the first base and the closed end of the first cup, a first cap received in the first cup, pressed onto the first base and surrounding the second opening end of the connecting tube, the first cap having a closed end separated from the second opening end of the connecting tube and an opening end pressed onto the first base so as to define a first tortuous air channel in the first cup;

a second cup mounted on the opening end of the first cup and having an opening end and a closed end mounted on the opening end of the first cup and with a bottom hole defined through the closed end, a guide tube mounted on the closed end of the second cup and communicating with the bottom hole in the closed end of the second cup and having a top opening end;

a second base formed on the guide tube and received in the second cup, the second base having a bottom separated from the closed end of the second cup so as to define a gap between the bottom of the second base and the closed end of the second cup, and the second base having multiple through holes defined through the second base and communicating with the gap between the second base and the closed end of the second cup; and a second cap received in the second cup, pressed onto the second base and surrounding the top opening end of the guide tube, the second cap having a closed end separated from the top opening end of the guide tube and an opening end pressed onto the second base so as to define a second tortuous air channel in the second cup.

2. The detecting device as claimed in claim 1 further comprising a lid mounted on the opening end of the second cup and having a top hole defined through the lid.

3. The detecting device as claimed in claim 1 further comprising a connector mounted on the cover and communicating with the through hole in the cap, wherein the first end of the connecting tube is attached to the connector so that the connecting tube is connected to the cover through the connector.

4. The detecting device as claimed in claim 3 further comprising a releasing valve attached to the connector.

5. The detecting device as claimed in claim 1 further comprising at least one O-ring mounted around the closed end of the second cup and abutting an inner surface of the opening end of the first cup to provide a sealing arrangement between the first cup and the second cup.

* * * * *